(12) United States Patent
Bhatti et al.

(10) Patent No.: US 8,266,019 B2
(45) Date of Patent: Sep. 11, 2012

(54) OPTIMIZING RETRIEVAL OF OBJECT-ASSOCIATED INFORMATION

(75) Inventors: Nina Bhatti, Mountain View, CA (US); Nicholas Lyons, Sunnyvale, CA (US); John C. Schettino, Jr., San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2521 days.

(21) Appl. No.: 11/017,772

(22) Filed: Dec. 22, 2004

(65) Prior Publication Data

US 2006/0149635 A1 Jul. 6, 2006

(51) Int. Cl.
*G06Q 10/00* (2006.01)

(52) U.S. Cl. ........ 705/28; 705/64; 705/22; 705/23; 705/51; 705/76; 705/57; 235/385; 235/462; 235/472; 235/383; 340/572; 340/539; 340/825; 340/568

(58) Field of Classification Search .......... 705/28
See application file for complete search history.

(56) References Cited

U.S. PATENT DOCUMENTS

| | | | |
|---|---|---|---|
| 5,151,684 A | 9/1992 | Johnsen | |
| 5,874,896 A | 2/1999 | Lowe et al. | |
| 5,933,829 A | 8/1999 | Durst et al. | |
| 5,978,773 A | 11/1999 | Hudetz et al. | |
| 6,108,656 A | 8/2000 | Durst et al. | |
| 6,129,274 A | 10/2000 | Suzuki | |
| 6,169,483 B1 | 1/2001 | Ghaffari et al. | |
| 6,169,975 B1 | 1/2001 | White et al. | |
| 6,179,206 B1 | 1/2001 | Matsumori | |
| 6,199,048 B1 | 3/2001 | Hudetz et al. | |
| 6,199,753 B1 | 3/2001 | Tracy et al. | |
| 6,294,999 B1 | 9/2001 | Yarin et al. | |
| 6,542,933 B1 | 4/2003 | Durst et al. | |
| 6,572,016 B2 | 6/2003 | Saveliev et al. | |
| 6,594,549 B2 | 7/2003 | Siegel | |
| 6,604,650 B2 | 8/2003 | Sagar | |
| 6,614,351 B2 | 9/2003 | Mann et al. | |
| 6,616,047 B2 | 9/2003 | Catan | |
| 6,628,199 B1 | 9/2003 | Ehrensvard et al. | |
| 6,702,146 B2 | 3/2004 | Varis | |
| 6,732,884 B2 | 5/2004 | Topliffe et al. | |
| 6,950,939 B2 | 9/2005 | Tobin | |
| 6,985,870 B2 | 1/2006 | Martucci et al. | |
| 7,080,041 B2 | 7/2006 | Nagel | |
| 7,127,261 B2 | 10/2006 | Van Erlach | |
| 7,152,047 B1 | 12/2006 | Nagel | |
| 2001/0047293 A1* | 11/2001 | Waller et al. .......... 705/10 |
| 2002/0117544 A1 | 8/2002 | Wolf et al. | |
| 2003/0195818 A1 | 10/2003 | Howell et al. | |
| 2003/0227392 A1 | 12/2003 | Ebert et al. | |
| 2004/0010425 A1 | 1/2004 | Wilkes et al. | |
| 2004/0070491 A1 | 4/2004 | Huang et al. | |
| 2004/0079804 A1 | 4/2004 | Harding et al. | |
| 2004/0128555 A1 | 7/2004 | Saitoh et al. | |
| 2005/0108659 A1 | 5/2005 | Philyaw | |

(Continued)

OTHER PUBLICATIONS

Wang, Quan. Cost-based object query optimization. 2002, Oregon Health & Science University, 265 pages.*

(Continued)

*Primary Examiner* — F. Zeender
*Assistant Examiner* — Fawaad Haider

(57) ABSTRACT

A method of optimizing the retrieval of object-associated information may include identifying data associated with an object identification. At least one optimization parameter for the retrieval of data associated with an object identification is also identified. An amount of the associated data for transmission is determined using the at least one optimization parameter.

17 Claims, 8 Drawing Sheets

U.S. PATENT DOCUMENTS

2005/0114270 A1     5/2005     Hind et al.
2006/0187048 A1     8/2006     Curkendall et al.
2007/0276984 A1     11/2007     Schuessler

OTHER PUBLICATIONS

Butschli, J-"VA Hospital Rests 'Talking' Label"—Packworld.com—http://packworld.com.cds_print.html?rec_id=12555 downloaded Jan. 31, 2002—pp. 1-4.

Want, R—"The Magic of RFID"—vol. 2 No. 7 Oct. 2004—Intel Research—http://www.acmqueue.com/modules.php?name=content&=showp—pp. 1-9.

Reynolds, P et al—"Packing Delivers for Pharmaceutical and Medical Firms"—Packword.com—http://www.packworld.com/cds_print.html?rec_id=18114 downloaded Jan. 31, 2005—pp. 1-3.

Chappell G et al—:Audio-ID in the Box: The Value of Auto-ID Technology in Retail Stores—Accenture—Feb. 2003.

\* cited by examiner

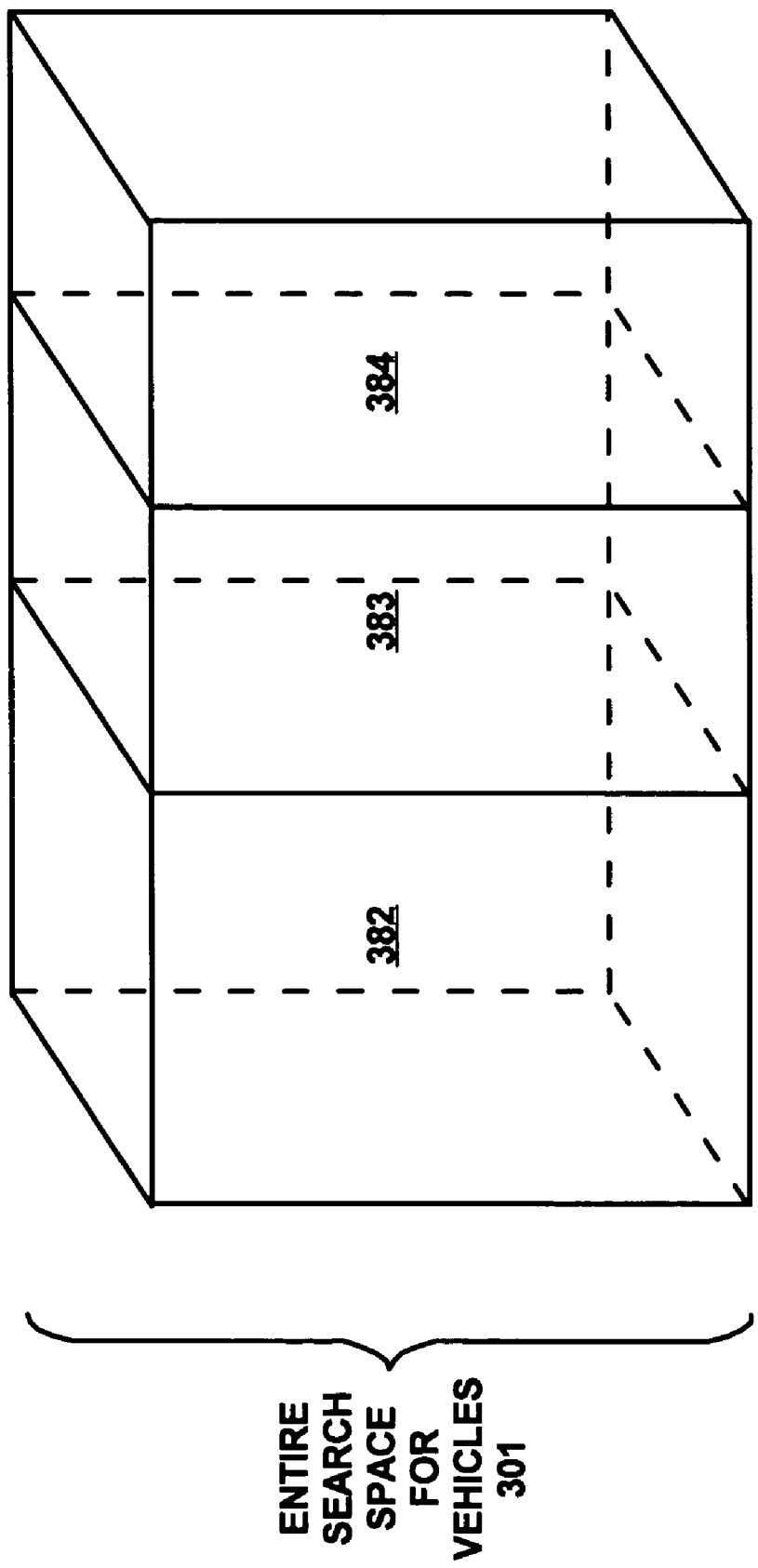

OPTIMIZING RETRIEVAL OF OBJECT-ASSOCIATED INFORMATION

TECHNICAL FIELD

The embodiments of the invention relate to retrieving information associated with an object. More particularly, one or more embodiments of the invention relate to determining an amount of the associated information to retrieve using an optimization parameter.

BACKGROUND

Various systems use transponders to identify objects from a distance by associating a transponder with the object. Objects may be identified using, for example, either an active transponder or a passive transponder. An active transponder contains its own power source, whereas a passive transponder lacks its own power source. A passive transponder may, for example, obtain power from an electric or magnetic field provided by a reader. One class of transponders includes radio frequency identification (RFID) tags. For example, an RFID tag is programmed with a unique identification code that is used to identify a specific object the tag is attached to, and an RFID tag reader is used to retrieve the code from the tag. Electronic Product Codes (EPC) are also becoming popular, and may include a product class identifier as well as a unique identification code. These EPC codes may be stored in an RFID tag. Other types of systems may use a product class identifier, such as a Uniform Product Code ("UPC") symbol, and a reader, such as a bar code reader, for reading the UPC symbol.

These systems differ in that they use different mediums for storing information about an associated object. For example, an RFID tag may store a code in memory and a UPC symbol may be provided on a printed medium. These systems are similar in that the information stored in the medium may be used to retrieve additional information about the object. For example, a UPC symbol may be scanned and information about the object is retrieved based on the scanned UPC symbol. However, a user interested in obtaining information about the object may have little or no control over the information retrieved. For example, scanning a UPC symbol may only result in retrieving static information about the object, such as all the information about the object stored in the reader system or a connected database.

Static information obtained from conventional transponder systems is of limited use and application. In addition, if the retrieved information is being transmitted over a network, having no control over the data being retrieved may result in long latencies or increased costs if a fee is associated with using the network.

SUMMARY

An embodiment of a method of optimizing the retrieval of object-associated information includes identifying data associated with an object identification. At least one optimization parameter for the retrieval of data associated with an object identification is also identified. An amount of the associated data for transmission is determined using the optimization parameter.

BRIEF DESCRIPTION OF THE DRAWINGS

Embodiments are illustrated by way of example and not limitation in the accompanying figures in which like numeral references refer to like elements, and wherein:

FIG. 3B depicts a schematic illustration of a partitioned search space according to an embodiment;

DETAILED DESCRIPTION OF THE EMBODIMENTS

For simplicity and illustrative purposes, the principles of the embodiments are described. However, one of ordinary skill in the art would readily recognize that the same principles are equally applicable to, and may be implemented with variations that do not depart from the true spirit and scope of the embodiments. Moreover, in the following detailed description, references are made to the accompanying figures, which illustrate specific embodiments.

Figure 1:
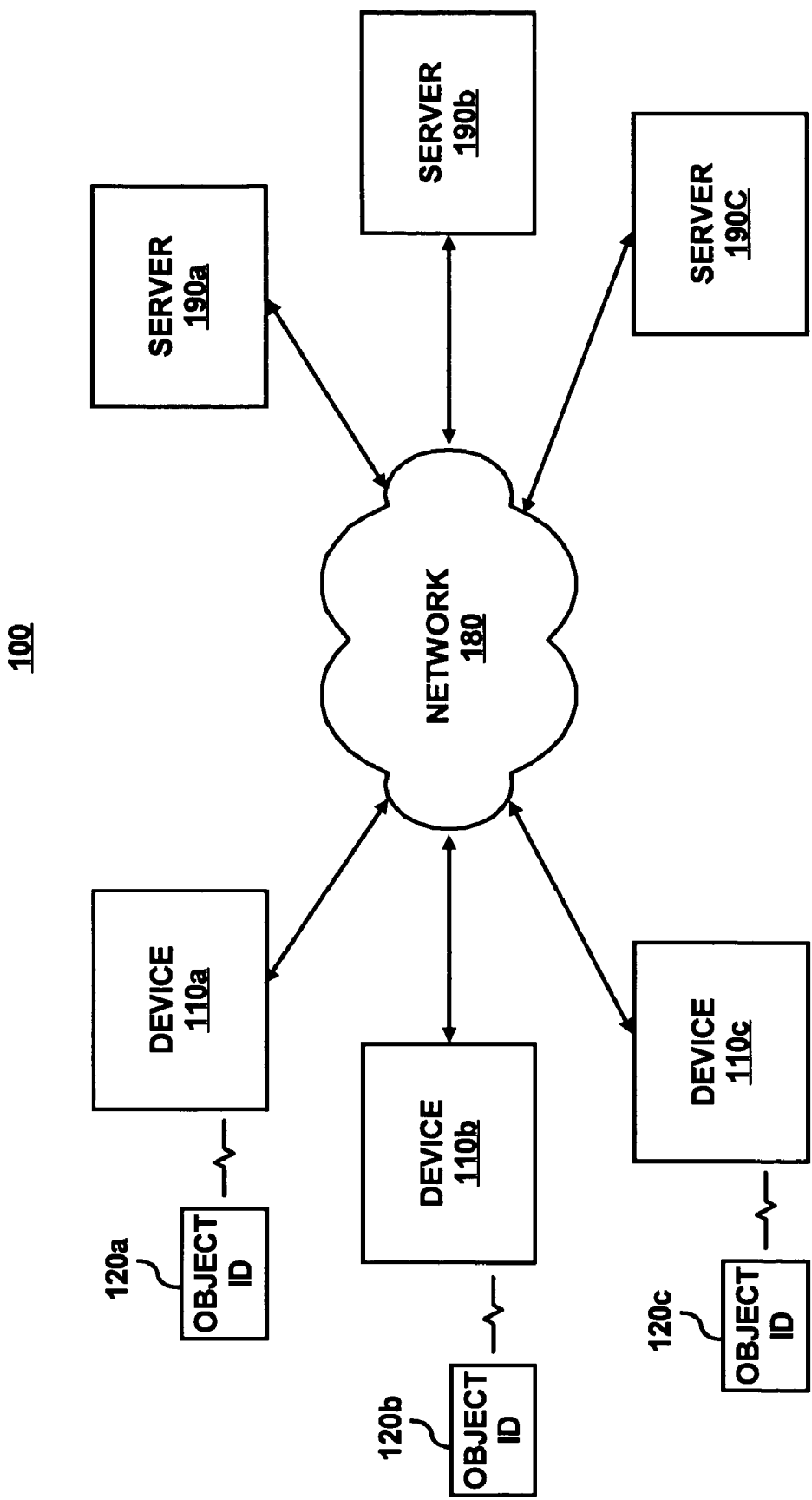
FIG. 1 depicts a general network diagram showing a high-level architecture according to an embodiment.

FIG. 1 illustrates a system 100 including a plurality of devices 110, such as 110a, 110b, 110c, and a plurality of servers 190, such as 190a, 190b and 190c connected via a network 180.

The devices 110a-110c are configured to read the object identifications (object IDs) 120a-120c. For example, the device 110a may read object ID 120a, the device 110b may read object ID 120b, and the device 110c may read object ID 120c. The devices 110a-110c may include conventional readers, such as scanners or an RFID tag reader. The devices 110a-110c may also include conventional user devices, such as PDAs (personal digital assistants), cellular phones, and other handheld devices equipped with readers operable to read an object ID.

An object ID 120a-120c may be read from an RFID tag, label, or other storage medium. In the case of an RFID tag, the object ID 120a-120c is stored in the RFID tag and read from the RFID tag using the device 110. An object ID 120a-120c, such as the object ID 120a, may include any type of machine readable code. An object ID 120a-120c may include a unique ID for each object or may comprise an ID, such as a UPC symbol or other product class identifier, that identifies a class of objects or products.

When an object ID, such as the object ID 120a, is read by a device 110, for example a device 110a under a user's control, a communication with one or more of the servers 190a-190c via the network 180 may be initiated for retrieving information associated with the object ID 120a and ultimately the object having the object ID 120a. The retrieved information is transmitted to the device 110a via the network 180. Any reasonably suitable information retrieval techniques may be used, including, but not limited to, one or more cache management techniques.

According to one embodiment, the amount of data to be retrieved by one or more of the servers 190a-190c and transmitted to the device 110a is based on one or more optimization parameters associated with the transmission of the data.

One or more optimization parameters may be selected by a user, may include default options and other parameters, and may be calculated. Optimization parameters may also be set by one or more content providers, for instance, providers of content on the Internet or other sources of information, or set according to the specifications of a particular user device or one or more backend services, to optimize the transmission of associated data to the device 110*a*. Examples of optimization parameters include, but are not limited to, bandwidth, available memory capacity of the user device, cost of data transfer, latency of data transfer, user preferences of the amount of data to be received, and other parameters associated with data transfer and data storage. Thus, the total amount of information retrieved by one or more of the servers 190*a*-190*c* and transmitted to the device 110*a* may be optimized for speed, cost, or other factors.

In one embodiment, the amount of associated data, based on one or more optimization parameters, may be determined by identifying a threshold of the one or more optimization parameters and selecting the amount of associated data, such that the threshold is not exceeded. For example, the amount of data transmitted to the device 110*a* may be controlled to remain below the available memory space of the device 110*a*.

In addition to or instead of optimization parameters, customization parameters may be used to control the information transmitted to a user. The type of data to be retrieved by one or more of the servers 190*a*-190*c* and transmitted to the device 110*a* may be customized based on a user's request, a user's observed behavior, or other customization parameters.

A customization parameter may include any parameter used to customize or tailor the type of information transmitted to a user. Customization parameters may include one or more user-selected parameters based on personalized preferences or user-selected choices about the types of information to receive. Customization parameters may also include default options and other parameters and may also be calculated. Customization parameters may be derived from observed user behavior, such as observing products selected by the user and observing user responses to queries, which may, for instance, be specific to the user requesting the information. In one example, the observed behavior of a user may indicate that the user has a dog based on a selection of dog food by the user. The observed behavior may also be based on an aggregate of observed behaviors for different users. Customization parameters may operate to enhance the quality and type of information for the user by tailoring the data delivered. In addition, optimization parameters and customization parameters may be determined independently.

Customization parameters may be used to customize any type of information selected and transmitted to a user. As an example of a customization parameter, a user may customize the information received based on a personalized preference for obtaining information related to a specific product category. For example, a customization parameter may be a user's preference for organic foods. The device 110*a* may be used to read an object ID from an RFID tag or other storage medium provided in an object from a grocery store. The server 190*a* may transmit information to the device 110*a* for organic produce available from the grocery store.

As another example of a customization parameter, a consumer may have a personalized preference for obtaining information related to a category of auto parts manufactured by a specific auto manufacturer ABC. In this case, the customization parameter may be used by the consumer to customize or tailor the type of information received to include only information pertaining to the desired category of auto parts. For example, by reading an object ID from an RFID tag provided on the packaging of an auto part manufactured by the auto manufacturer ABC, the user may customize the information received by receiving only information pertaining to the desired category of auto parts.

A customization parameter may be used to receive any type of information related to a product category or other information category, for example. As illustrated by the examples discussed above, customization parameters may be used by a user to filter the type of information that is received by the user, based for example on one or more user preferences. Customized information received by the user, based on one or more user's personalized preferences, may include information about any characteristic of a product, such as the available or optional features for a product, a detailed description of each product, and any other type of product information, such as makes, models, types, colors, sizes, shapes, or any other attribute of one or more products within a product category. Product category information may also include information on the materials used to manufacture the products, warranty information, related products, sales, discounts, other price information, etc.

Other categories of information may be customized by a user, including categories of persons, places, or things. Information may also be customized by a user for retrieval in one or more different languages, or other desired formats, including information delivered as text, graphics, etc., for delivery to a user based on a user's personalized preference. A user may also desire to customize information, for example for a category of products, based on any other parameter that may be customized, including language, geographic location, etc.

The types of information retrieved by a server 190 and transmitted to a device 110 may be customized for other factors, user preferences or options. In another example, it may be observed that the user has requested information about a specific stereo product included within a product category offered by a particular company. Thus, only information related to the specific stereo product may be transmitted to the user. Aggregated behavior of different users may also be used to derive customization parameters for a user or group of users.

Predictive techniques, which may be based on observed behavior, may also be used to determine the amount or type of data to be retrieved by a server 190 and transmitted to the device 110*a*. In one respect, the predictive techniques may be used to derive customization parameters. For instance, the authentic or actual behavior of a particular user may be observed, captured, analyzed, and used to retrieve and transmit information to the particular user. In addition, a particular user may have been observed to have used a device 110*a* to read only object IDs associated with auto parts manufactured by a specific auto manufacturing company. This observed behavior may provide a basis for selecting and transmitting object-associated information when the user submits future requests for information.

According to another embodiment, predictions may be based on aggregated data across all users or a subset of similar users. Aggregated data may then be used to determine the amount or type of data to be retrieved by a server 190 and transmitted to a device 110*a*. Predictive techniques may also be used in conjunction with one or more optimization or customization parameters for selecting and transmitting associated data to the device 110*a*.

Figure 2:
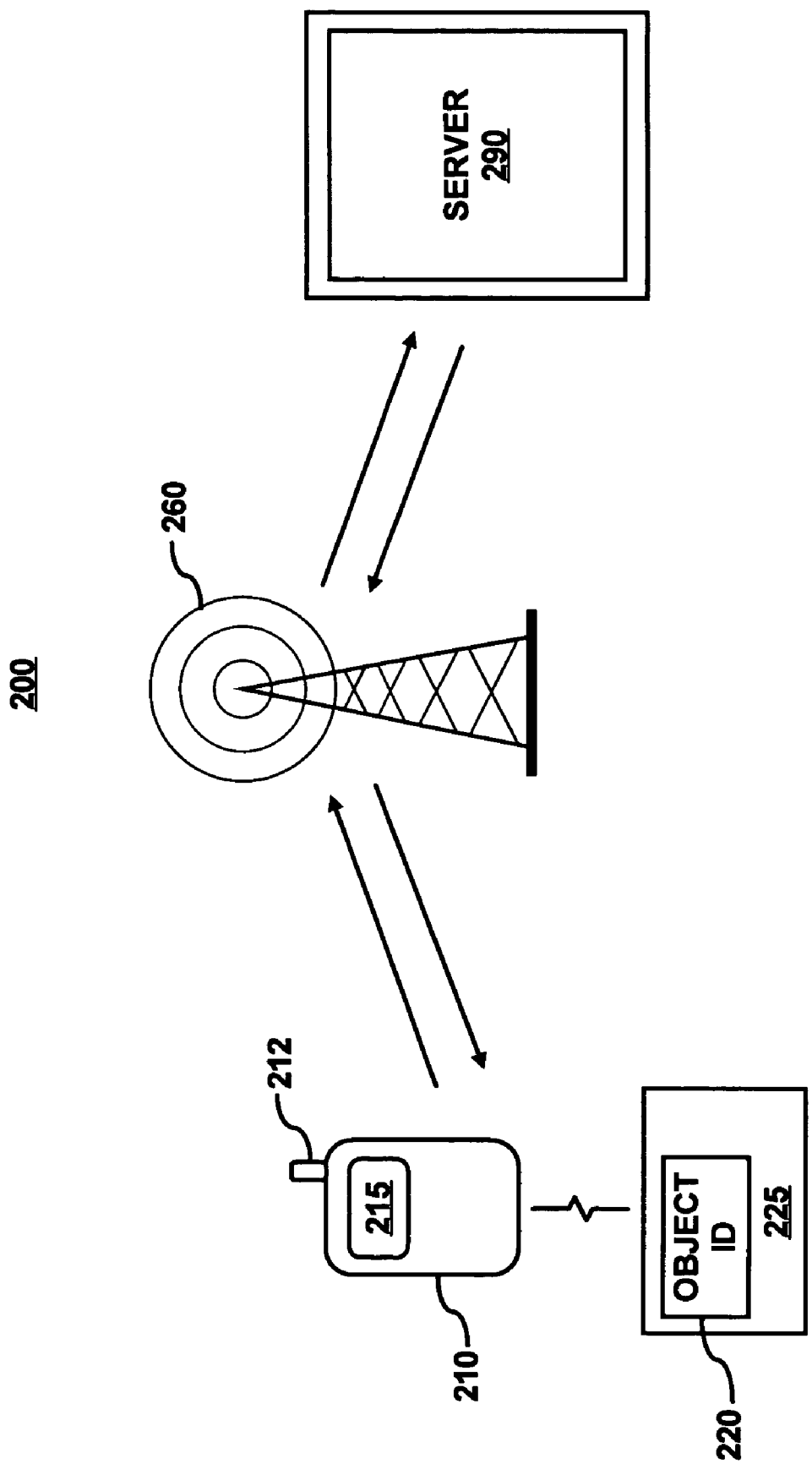
FIG. 2 depicts a system for providing data associated with an object ID according to an embodiment.

Referring to FIG. 2, a schematic diagram of a system 200 for providing object-associated information in an interactive setting is illustrated. A cellular phone 210, in addition to being operable to perform cellular communication functions, is also operable to read an object ID 220. In this regard, the cellular phone 210 comprises an antenna 212 for transmitting a signal to, and receiving a signal from, a cellular tower 260. The cellular phone 210 also comprises a screen 215 for displaying information, including data received from the server 290.

The cellular phone 210 is an example of a type of device 110 shown in FIG. 1. Although the cellular phone 210 is shown in FIG. 2, any other device or reader, including for example a handheld or portable device, a mounted device or reader, or other object ID detection device may be used to read the object ID 220.

The object ID 220 is read from a storage medium, for instance, an RFID tag, label, etc., which may be provided on the object 225 or on the object's packaging. In addition, the object ID 220 may include a unique ID for each object 225. For example, a store typically has several of the same items for sale. Each item or object may include an RFID tag with a unique serial number that uniquely identifies the item from other items. The object ID 220 may also comprise a product class identifier, which may include EPC or UPC codes, or other information.

The object 225 may include a consumer product or any other physical object, article or structure. A consumer product may comprise any product or article which is used in commerce, for example a consumer good or manufactured item. According to one embodiment, a user may obtain data associated with a consumer product, such as location information of the consumer product, manufacturer information associated with the consumer product, cost information of the consumer product, information about related consumer products, or other attributes of the consumer product.

A user may use the cellular phone 210 to read the object ID 220. After the cellular phone 210 reads the object ID 220, the cellular phone 210 may be used to transmit the object ID 220 to the cellular tower 260. The object ID 220 may then be transmitted to a node connected to a network, including, for example, the server 290. The network may include the Internet. Data that is associated with the object ID 220 is then identified by the server 290 and transmitted to the cellular phone 210 via the cellular tower 260.

Data may be transmitted between the cellular phone 210 and the server 290 using a HTTP standard protocol. However, the use of the HTTP standard protocol, another standard protocol, or another publicly available and accessible protocol in the transmission of either the object ID 220 or the resulting associated data is not required. For example, a proprietary protocol or non-standard protocol may be used in transmitting the object ID 220 and the resulting associated data and content to a user. Thus, a proprietary server may be used to provide specific content to a user, such as a user of the cellular phone 210 shown and described with reference to FIG. 2, without departing from a scope of the system 200.

The backend server, such as the server 290, may be a specific server that has specific content. For example, the server 290 may provide object-associated information about a specific type of brake pad that may be owned by the company that manufactures the specific type of brake pad. Object-associated information may also be retrieved from backend servers owned or operated by other information sources, such as a provider of consumer product information, and other sources.

In addition to identifying data that is associated with the object ID 220 (which may be performed using one or more customization parameters), the server 290 uses at least one optimization parameter for optimizing the retrieval and transmission of associated data to the cellular phone 210. As described above, optimization parameters may be used to control the amount of data transferred to the cellular phone 210 based on factors such as cost, latency, device specifications, etc. For example, the user may select a minimum of associated data to be received if the user is charged based on the amount of data or time of data transfer for transmitting the associated data to the cellular phone 210 from the server 290.

The amount of associated data retrieved may be determined based upon the amount calculated by any of the user, the cellular phone 210, and the server 290. For example, a user may desire to receive a specific amount of information associated with a brake pad in a store, wherein the brake pad is associated with a specified type of vehicle or auto manufacturer.

In addition, customization parameters may be used to determine the type of information transferred to the cellular phone 210. For example, a user may have been observed to have requested information associated with a particular make and model of a vehicle, which may be the make and model of the vehicle owned by the user. If the user reads a tag associated with a brake pad, the back end service only transmits information about brake pads for the make and model of the vehicle identified based on the user's observed behavior.

In another example, a customization parameter may be a user's preference for organic foods. The user reads a feature ID from an RFID tag or other storage medium provided in an advertisement for produce from a particular grocery store. The server 190A transmits information to the user for organic produce available from the grocery store. This customization parameter may be derived from a user-selected preference for organic foods or form observed behavior for the user.

As another example of using customization parameters, customization parameters may be based upon one or more observed behaviors of a particular user, as opposed to overt action by a user to select a customization parameter. Customization parameters based on observed behaviors may be used by the server 190A to customize the information retrieved and transmitted to the particular user. For example, a device 110 may be used by a particular user to read a tag associated with a light fixture in an advertisement. An observed preference for that particular user may be that the user shows interest in brushed steel light fixtures. Thus, based on the observed behavior of that particular user, the server 190A may customize the information retrieved and initially transmit information pertaining to brushed steel light fixtures to the user. Thus, customization parameters may be determined based on observed behaviors of a particular user. Also, customization parameters may be determined based on observed behaviors of a group of users. For example, an aggregated preference for users in the age group of the particular user is that these users prefer brushed steel light fixtures. Thus, the server 190A may initially transmit information pertaining to brushed steel light fixtures to the user. The type of information retrieved by one or more of the servers 190 and transmitted to the cellular phone 210, for example, may also be customized according to other factors, user preferences or options.

In another embodiment, one or more customer-relationship management (CRM) techniques, methods, tools, software, etc., may be used to gather, analyze, retrieve and deliver object-associated information to one or more users. CRM may include, for example, any process, method, system, or tool that operates to enhance the amount or type of information that is gathered, processed, and delivered to a user, such as a customer, by acquiring data about the user and thus learning about the user. CRM may thus include any approach or system for information retrieval and delivery that is based on learning, for example using one or more "learning algorithms" to learn about a particular user, such as learning algorithms employed using neural networks. Such learning algorithms may be employed by one or more backend services to enhance the type and quality of information delivered to an individual, based on a profile of the individual, observed buying habits of the individual, changes in actual observed behavior of the individual, or other information gathered that is specific to the particular individual.

CRM techniques may also be based on any other method for gaining information about a particular user. CRM may be used to gather information about customer preferences, buying habits, demographics, age, gender, language preferences, and other information related to an individual. In addition, CRM may be used in enhancing the marketing, sales, and other business activities of a company directed at providing information to one or more consumers or consumer groups.

For example, a provider of information that utilizes the server 290 may utilize one or more CRM approaches to acquire information about a particular user's observed behavior, activity patterns, personalized preferences, or other information pertaining to the behavior and activity of a particular user. CRM methods and tools may also be used to acquire information and learn about the behaviors and activities based on the aggregate activities or behaviors of one or more groups of individuals. Thus, CRM enables a provider of information to retrieve and transmit object-associated information based on information acquired and learned about an individual or a group of individuals. CRM may thus enhance the quality of processes used in delivering information, for example, to consumers or customers seeking information about a type of product or a product category.

The user may use the cellular phone 210 to read the object ID 220 and to transmit the object ID 220 to the server 290. Based on calculations of available storage capacity of the cellular phone 210, the user may decide to retrieve a substantially limited amount, for instance, 100 kilobytes of data associated with the brake pad having the object ID 220. The user may also request additional data that is associated with the brake pad having the object ID 220 by selecting from at least one menu option displayed on the screen 215 of the cellular phone 210. By identifying one or more optimization parameters or customization parameters, such as the type or amount of object-associated information that a user desires, the retrieval of object-associated information becomes more efficient and may be under the user's control.

Figure 3A:
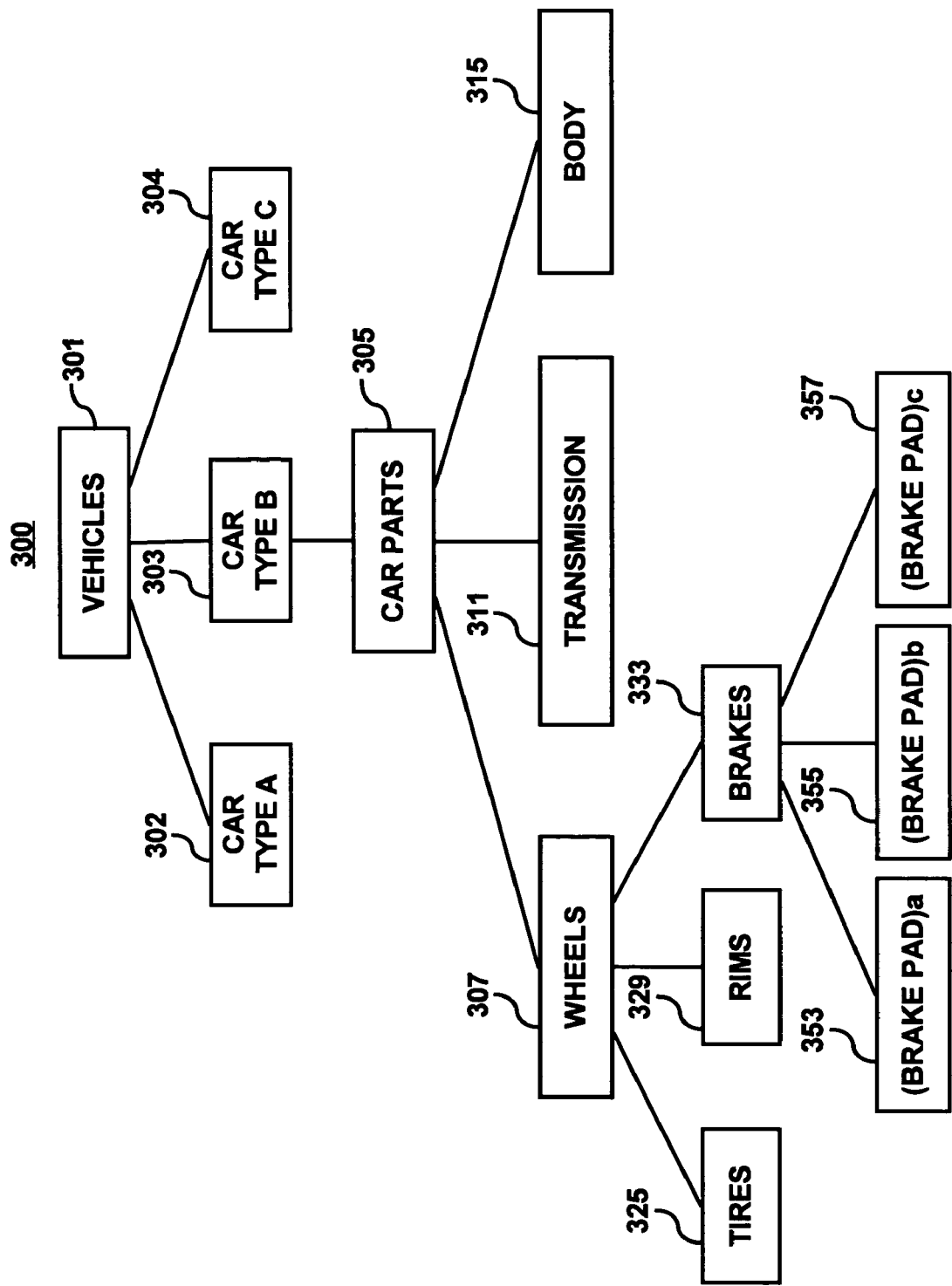
FIG. 3A depicts an overview of a tree and leaf structure according to an embodiment.

The amount of associated data to be transmitted may be determined through use of at least one optimization parameter that depends on utilization of a tree and leaf architecture. FIG. 3A provides a schematic illustration of a tree and leaf architecture of object-associated information in accordance with one embodiment. The tree structure 300 may include information stored in the server 290, as shown in FIG. 2, which may be accessed in response to an input or request for particular data associated with an object ID 220. As represented by FIG. 3A, associated data 301-357 is stored in the tree structure 300. Within the tree structure 300, a plurality of leaves is provided, wherein each of the leaves represents a node in the tree structure 300. Each of the plurality of leaves stores data associated with the object ID 220 shown in FIG. 2.

The depth or amount of associated information included within each leaf may be weighted for the information retrieval. For example, an electronic newspaper, such as an online newspaper that may be accessed using the Internet, represents one type of tree structure 300 comprising a plurality of leaves. The leaves may include, for example, links to various sections of the online newspaper, such as headlines, weather, sports, etc. Based on the observed behavior of an individual, or a collective group of individuals, who access the various sections of the online newspaper, the data on observed behavior may show that 75% of the readers access the headline section, 30% of the readers access the sports section, and 10% access the weather section. Based on this observed behavior, the percentages may be used to retrieve corresponding amounts of the contents below the respective leaves, for instance, 75% of a cache space may be used for information on headlines. Customization parameters may be derived from the percentages to control the amount of data selected from the tree for transmission to the user.

In the example shown in FIG. 3A, the tree structure 300 pertains generally to vehicles 301. According to one embodiment, the amount of associated data is determined by first identifying a leaf within the tree structure 300 for the object ID 220. For example, a user may be interested in receiving data associated with a particular type of brake pad. In this case, the leaf of interest is (brake pad)$_C$ 357. After a user has scanned or read the object ID 220 corresponding to the (brake pad)$_C$ 357, and once the object ID 220 is obtained, the cellular phone 210 transmits the object ID 220 to the server 290. In the example, the object ID 220 of the brake pad identifies (brake pad)$_C$ 357. Because the object ID 220 specifically identifies the type of brake pad as (brake pad)$_C$ 357, data will not be provided that is associated with (brake pad)$_A$ 353 or (brake pad)$_B$ 355 which may be for different vehicles. For example, data may be provided that is associated with a particular type of vehicle 301 associated with the user's vehicle, such as the car type B 303, as shown in FIG. 3A. Accordingly, information will not be retrieved that pertains to other types of vehicles, for instance, car type A 302 or car type C 304. Thus, the search space is limited to the information only for car type B 303.

Once a leaf has been identified within the tree structure 300, wherein the leaf represents data associated with the object ID 220, a point up the tree structure 300 from the leaf may be determined based on one or more optimization or customization parameters. Referring to the example above, a user may desire other data associated with the particular type of brake pad identified as (brake pad)$_C$ 357. To determine the amount of data to be obtained that is associated with (brake pad)$_C$ 357, at least one optimization or customization parameter may be used to determine at what point up the tree structure 300 information should be obtained.

According to an embodiment, one or more optimization parameters are identified and the associated data in the tree structure 300 is retrieved from the highest point in the tree structure 300 to the leaf for the object ID 220, wherein the highest point is selected based on the optimization parameters. For example, if the optimization parameters determined that the amount of information retrieved included information on all the cars within the car type B 303 that are associated with the (brake pad)$_C$ 357, then the highest point in the tree structure 300 would be the point identified as the car type B 303. In such case, the amount of information retrieved would include all the information from the highest point in the tree structure 300, namely, the car type B 303, to the leaf, namely the (brake pad)$_C$ 357. Information would not, however, be retrieved for the unrelated leaves identified as (brake pad)$_A$ 353 and (brake pad)$_B$ 355, or the unrelated leaves identified as car type A 302 or car type C 304.

If the optimization parameters determined that the highest point in the tree structure 300 was the point identified as brakes 333, then the amount of information retrieved would include all the associated data inclusive from brakes 333 to (brake pad)$_C$ 357. Similar processes for retrieving information could apply to anywhere in the tree structure 300, depending on the amount of associated information that could be retrieved, which in turn would depend on the optimization parameters utilized. For example, information could be retrieved for any leaf (not shown) that was linked in the tree structure 300 to the points identified as transmission 311 or body 315.

In this manner, information may be retrieved to a certain depth of the tree structure 300, by retrieving all the data associated with an object ID 220 from a point in the tree structure 300 to an identified leaf. The associated data is communicated to the user, and the user may interact with one or more device applications using, for example, the cellular phone 210. According to one embodiment, the user may browse the retrieved information or navigate among an array of menu choices, and may further access data from the server 290.

Similarly to using optimizing parameters, customization parameters may be used to determine the amount of data to be retrieved based on the tree structure. As described above in one example, the car type B 303 may be the car type of the user's vehicle. Thus, only information from the tree 300 pertaining to the car type B 303 may be retrieved. Other types of customization parameters may also be used to control the amount of information transmitted to the user.

Referring to FIG. 3B, the retrieval of information associated with the object ID 220 may include the partitioning of a search space based on an intuitive user-initiated query. The tree structure 300 in FIG. 3A is represented as a three-dimensional search space in FIG. 3B. A search space may include any space, for example the tree structure 300 depicted in FIG. 3A, containing at least one set of information that may be searched. The search space may also be complex, such that the search space may include a large number or type of information sources. The entire search space may include information on all vehicles 301 within the tree structure 300. The search space may be partitioned with an intuitive user-initiated query.

The search space is shown partitioned into separate search spaces 382-384, corresponding to car types A-C, respectively, as shown in FIG. 3A. A user may use a cellular phone 210, for example, to read the object ID 220 corresponding to the (brake pad)$_C$ 357. The user-initiated query operates to partition the search space into different subsets of information, for example, information on car type A 302, information on car type B 303, and information on car type C 304. Because the (brake pad)$_C$ 357 is only associated with car type B 303, the search space contained within tree structure 300 is partitioned such that only the information associated with the (brake pad)$_C$ 357 is selected and transmitted to the user in response to the user-initiated query. According to another embodiment, a complex product search space may be partitioned such that only the relevant search space, namely the search space which contains information complementary to a specific object or product, is searched in response to a user-initiated query. Partitioning of the search space may also include using one or more optimization or customization parameters to determine the amount or type of data to search and transmit to the cellular phone 210.

Figure 4:
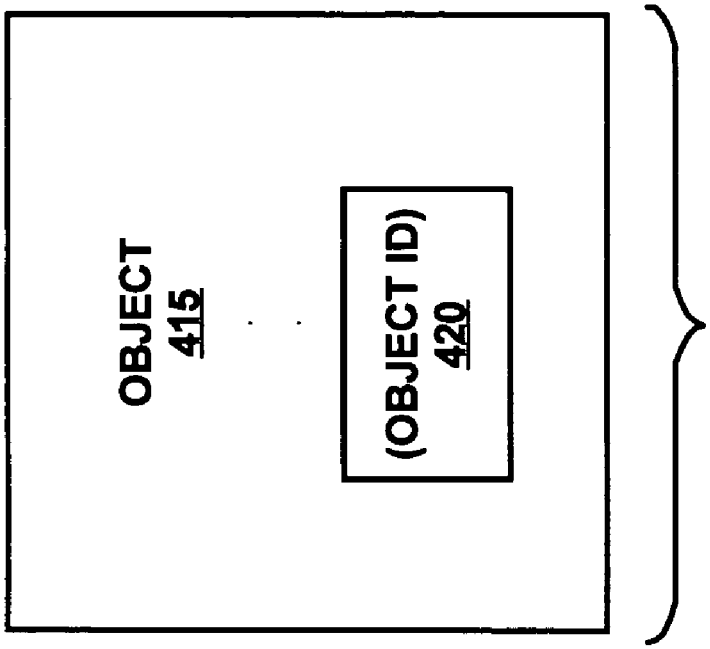
FIG. 4 depicts unique object identifications according to an embodiment.
Figure 4:
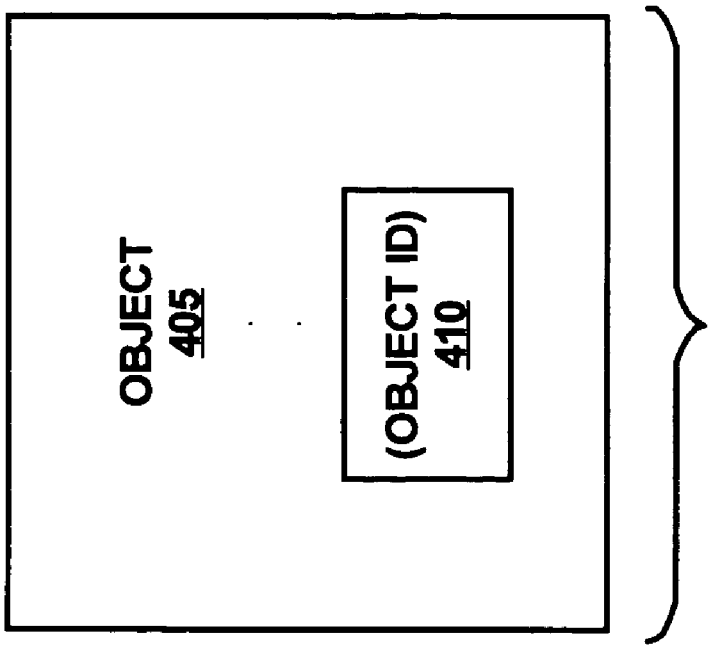

Referring to FIG. 4, a schematic diagram illustrates two distinct objects, namely objects 405 and 415, which are uniquely identified by the object IDs 410 and 420, respectively. Assume that the objects 405 and 415 are the same type of brake pads made by the same company but are located in two different stores 430 and 431. A user of, for example, the cellular phone 210 as shown in FIG. 2, may use the cellular phone 210 to read the object ID 410. The cellular phone 210 receives from the server 290 associated data for the object ID 410. However, the associated data includes information about other products in the store 430 rather than information about products from other stores, such as store 431. This is possible because of the unique object ID 410 that identifies the object 405 in the store 430 from other objects including objects of the same type. For example, the server 290 is operable to associate the unique ID of the object 405 with the store 430 and retrieve associated data for consumer products only in the store 430. It will be apparent that instead of unique IDs, and object ID may include more general IDs, such as a UPC symbol or other product class identifier, that identifies a class of goods or products.

Figure 5:
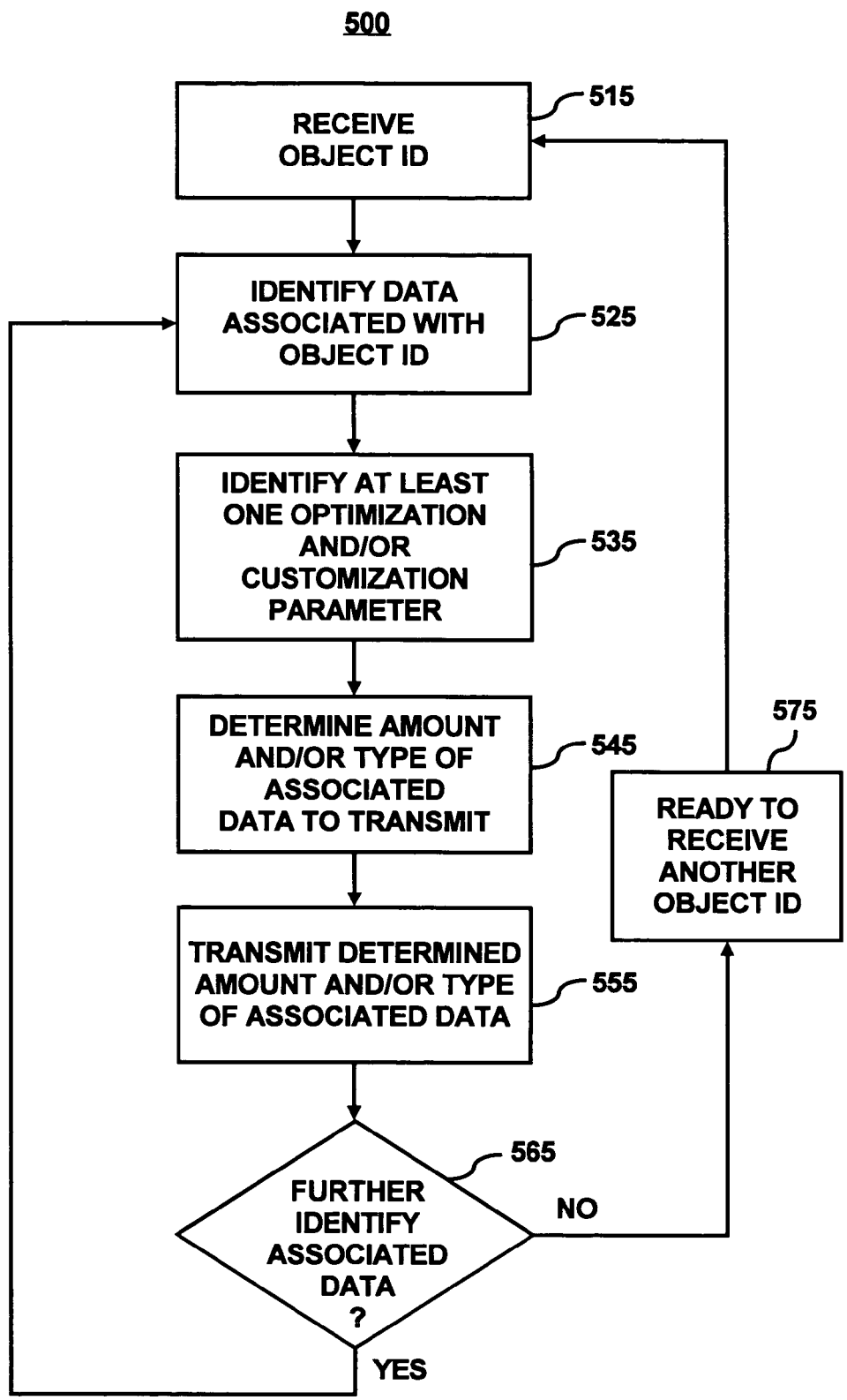
FIG. 5 depicts a flowchart representing a method of obtaining object-associated information using at least one optimization and/or customization parameter, according to an embodiment.

Referring to FIG. 5, a flowchart illustrates a method 500 in accordance with one embodiment. The method 500 is described with respect to the system shown in FIG. 2 by way of example and not of limitation. At step 515, the server 290 as shown in FIG. 2 receives the object ID 220 read by the cellular phone 210. At step 525, the data associated with the object ID 220 is identified by the server 290. At step 535, one or more optimization or customization parameters are identified for determining an amount or type of the associated data to transmit to the cellular phone 210. At step 545, the server 290 determines the amount or type of the associated data to transmit to the cellular phone 210 based on the identified optimization or customization parameter. At step 555, the determined amount or type of the associated data is transmitted to the cellular phone 210. According to one embodiment, and with reference to FIG. 3A, at least one optimization or customization parameter may be used in conjunction with a tree-leaf structure 300 for determining the amount or type of associated data to transmit to the cellular phone 210.

After a user receives the associated data from the server 290, the user may then decide whether to identify other data associated with the same object ID 220 (step 565). In one embodiment, a user may select additional information from one or more menus of information displayed on the screen 215 of the cellular phone 210. A handheld device, such as a PDA (personal digital assistant), may also display a screen that enables a user to select from one or more menu options. A menu may be displayed on the screen 215 and the user may decide to receive additional data associated with a specific object 225. The menus thus provide dynamic interaction to a user that is context-dependent and product-specific.

Instead of providing only limited information that is static, for instance, in the form of static URLs, one embodiment provides the capability for dynamic exchange of information associated with the particular object ID 220. For example, one or more menus may be used to navigate between complementary products, for instance, products with complementary features or other related characteristics. Associated data may be retrieved from a network or the server 290, as shown in FIG. 2. According to the flowchart shown in FIG. 5, a user may obtain object-associated information in an interactive setting, and is not limited to retrieving only static information associated with the object ID 220, such as a URL.

Figure 6:
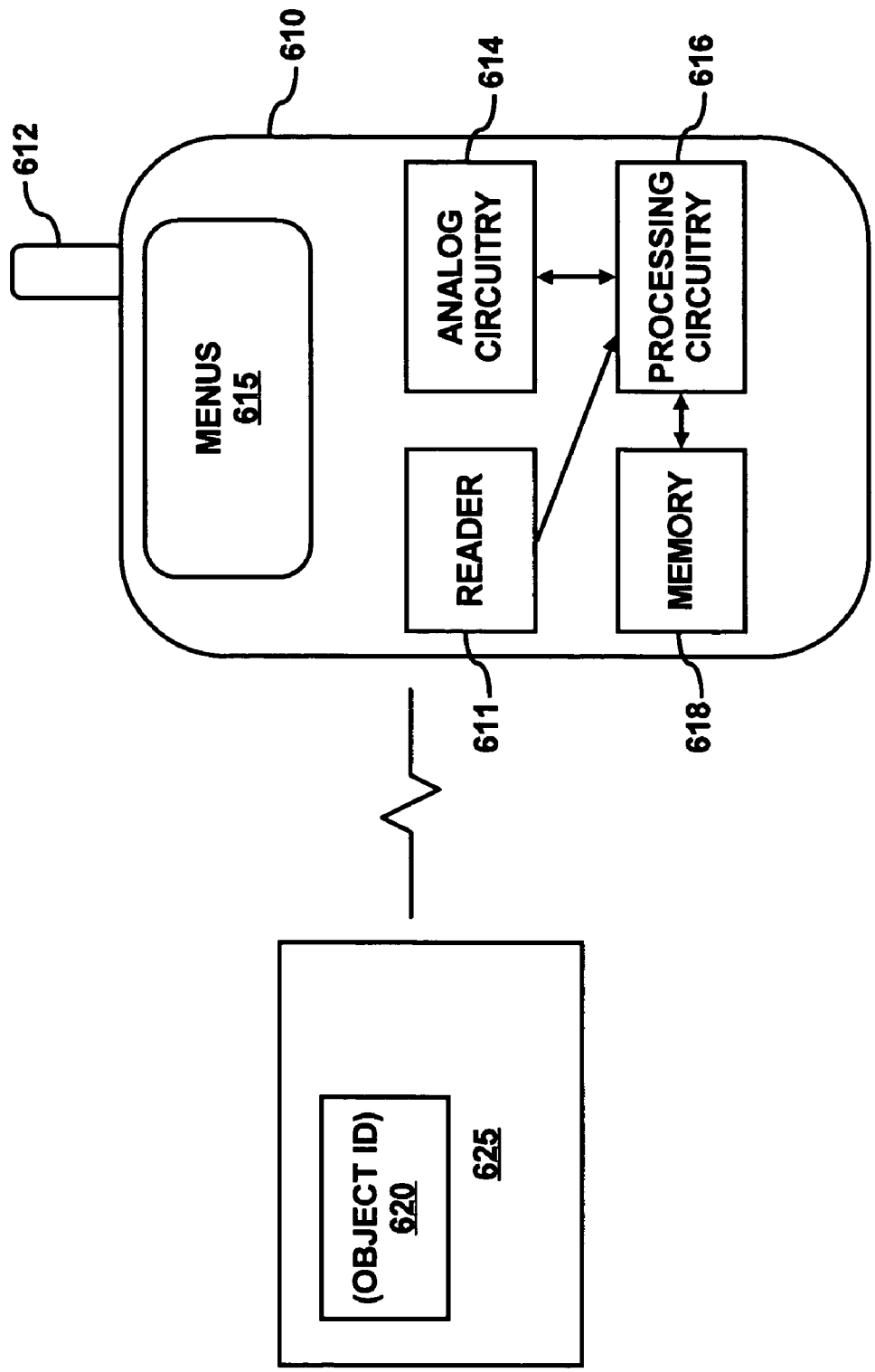
FIG. 6 depicts an apparatus for reading an object ID according to an embodiment.

Referring to FIG. 6, and with reference to FIG. 2, a cellular phone 610 is provided for receiving and displaying data associated with an object ID 620 on a screen 615. One or more menus may be displayed on the screen 615, and a user may decide to receive additional data associated with the object 625 having the object ID 620. Again referring to FIG. 2 and FIG. 5, if further data is requested relating to object ID 620, then another query may be sent by the user to an information network or to the server 290 (for instance, as shown in FIG. 2) to identify additional, associated data, as represented by step 525 in FIG. 5. If no further associated data is requested by the user, the cellular phone 610 may be used to read another object ID, as shown by step 575 in FIG. 5.

Referring again to FIG. 6, an example of a cellular phone 610 and an object 625, with a corresponding object ID 620, is shown in accordance with one embodiment. The object ID 620 may be retrieved from any type of tag, such as an RFID tag. The cellular phone 610 may comprise a reader 611, for example a scanner or camera, for reading a tag such as an RFID tag. The cellular phone 610 may also include analog circuitry 614, processing circuitry 616, and a memory 618. The processing circuitry 616 may generate a signal which may be modulated using the analog circuitry 614. The processing circuitry 616 may also receive the object ID 620 from the reader 611 and store the data in the memory 618. The cellular phone 610 may further comprise an antenna 612 for transmitting and receiving signals, for instance transmission of a signal to a server after reading the object ID 620, or transmission of a user request for additional information based on a menu selection. The reader device 610 may be connected to another computing device or a network, such that the device data may be downloaded. The cellular phone 610 may also include the screen 615 for displaying one or more menu options for the user. It should be noted that the cellular phone 610 may include other components not shown and known in the art.

Figure 7:
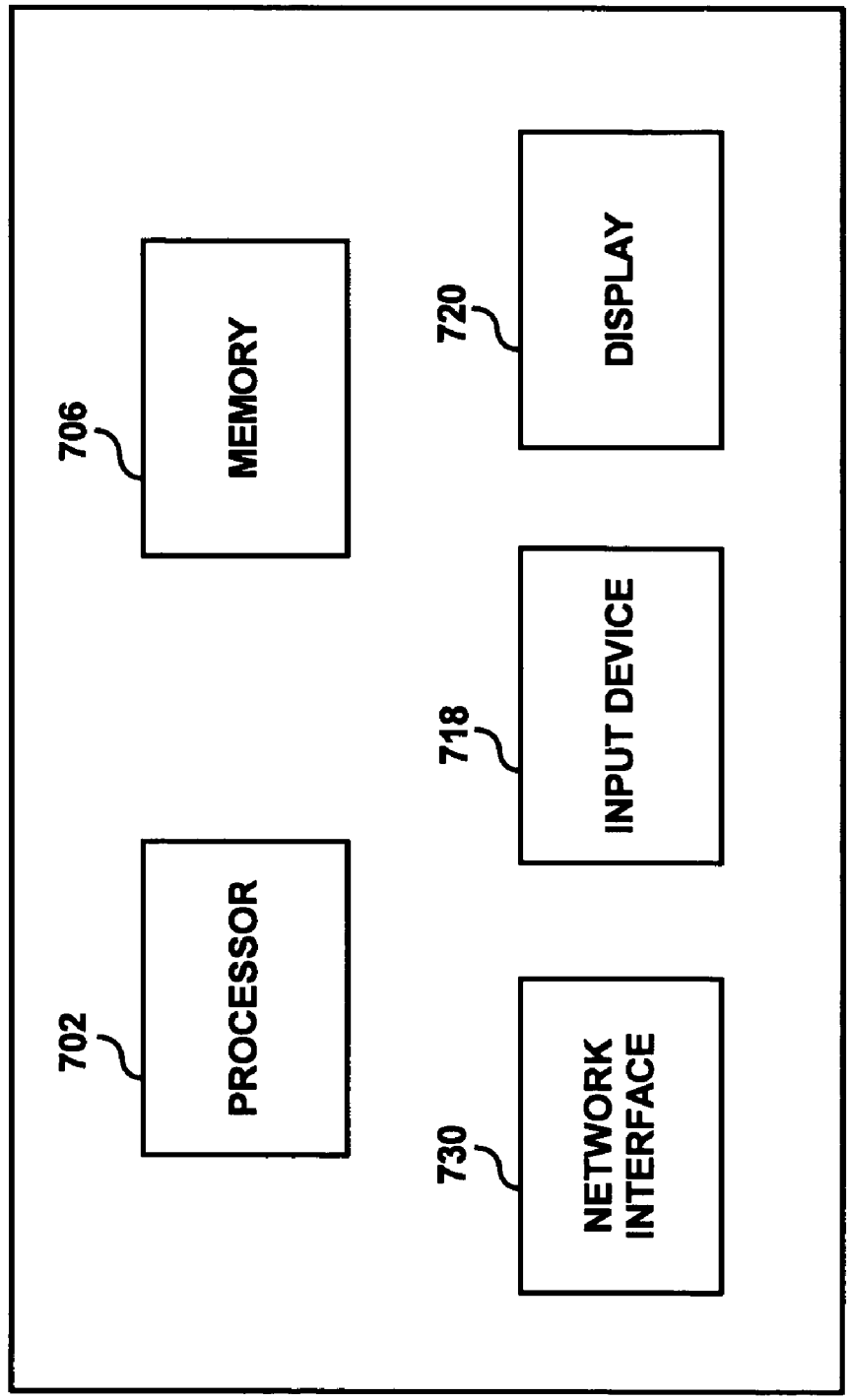
FIG. 7 depicts a computer system for providing data associated with an object ID according to an embodiment.

Referring to FIG. 7, and also with reference to FIGS. 1 and 2, a schematic diagram of a computer system 700 is shown in accordance with an embodiment. The computer system 700 shown may be used as a server in the systems shown in FIGS. 1 and 2. The computer system 700 may include one or more processors, such as processor 702, providing an execution platform for executing software. The computer system 700 also includes a memory 706, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 700 with one or more input devices 718, such as a keyboard, a mouse, a stylus, and the like and a display 720. A network interface 730 is provided for communicating with other computer systems. It will be apparent to one of ordinary skill in the art that FIG. 7 is meant to illustrate a generic computer system. Any type of computer system may be used. Furthermore, one or more components of the components of the computer system 700 are optional, such as the display and input devices, and other types of components may be used or substituted as is known in the art.

One or more of the steps of the operation 500, as shown in FIG. 5, may be implemented as software embedded on a computer readable medium, such as the memory 706, and executed by the processor 702. The steps may be embodied by a computer program, which may exist in a variety of forms both active and inactive. For example, there may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

What has been described and illustrated herein are embodiments along with some variations. While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A computer readable medium on which is embedded one or more computer programs, said one or more computer programs implementing a method of optimizing retrieval of object-associated information from a server to a device, said one or more computer programs comprising a set of instructions for:
    identifying data associated with an object identification received from the device;
    identifying at least one optimization parameter associated with transmission of the data associated with the object identification to the device; and
    determining an amount of the data associated with the object identification to transmit to the device using the at least one optimization parameter.

2. The computer readable medium of claim 1, wherein identifying data associated with an object identification further comprises identifying data associated with a unique identification of an object.

3. The computer readable medium of claim 2, further comprising a set of instructions for identifying data associated with a radio frequency identification tag for the object.

4. The computer readable medium of claim 1, wherein identifying data associated with an object identification further comprises identifying data associated with at least one of a UPC symbol and an Electronic Product Code.

5. The computer readable medium of claim 1, wherein identifying at least one optimization parameter further comprises identifying at least one of bandwidth, available memory capacity of the user device, cost of data transfer, and latency of data transfer.

6. The computer readable medium of claim 1, wherein determining an amount of the associated data to transmit using the at least one optimization parameter further comprises:
    identifying a threshold of the at least one optimization parameter; and
    selecting the amount of data such that the threshold is not exceeded.

7. The computer readable medium of claim 1, wherein determining an amount of the associated data to transmit using the at least one optimization parameter further comprises:
    storing the associated data in a tree structure;
    identifying a leaf within the tree structure, wherein the leaf represents data associated with the object identification;

determining a point up the tree structure from the leaf based on the at least one optimization parameter; and retrieving the associated data in the tree structure from the point to the leaf.

8. The computer readable medium of claim 7, wherein identifying a leaf within the tree structure further comprises:
receiving user input; and
selecting additional associated data from the tree structure based on the user input.

9. The computer readable medium of claim 1, wherein determining an amount of the associated data to transmit using the at least one optimization parameter further comprises:
determining an amount of the associated data to transmit based on predetermined user preferences.

10. The computer readable medium of claim 1, wherein transmitting the associated data further comprises transmitting at least one of a calculated amount, a predetermined amount based on user preferences, an amount determined by a server, an amount determined by a content provider, and a default amount.

11. The computer readable medium of claim 1, further comprising a set of instructions for identifying additional data associated with the object identification from at least one menu.

12. The computer readable medium of claim 1, further comprising a set of instructions for:
reading the object identification with a user device; and
transmitting the associated data to the user device.

13. The computer readable medium of claim 1, wherein the one or more computer programs further comprise a set of instructions for:
transmitting the associated data in the amount determined to the device.

14. The computer readable medium of claim 1, wherein the one or more computer programs further comprise a set of instructions for:
receiving the object identification from an individual associated with the device;
gathering data associated with the individual from which the object identification was received; and
wherein identifying data associated with the object identification received from the device further comprises identifying data associated with the individual.

15. The computer readable medium of claim 14, wherein the one or more computer programs further comprise a set of instructions for:
transmitting the associated data to the device.

16. The computer readable medium of claim 14, wherein gathering data associated with an individual further comprises a set of instructions for:
observing at least one type of behavior of the individual submitting the request; and
collecting data based on the at least one type of observed behavior.

17. The computer readable medium of claim 14, wherein gathering data associated with an individual further comprises a set of instructions for:
learning information about the individual; and
collecting data based on the information learned.

* * * * *